(12) United States Patent
Cotter et al.

(10) Patent No.: US 8,444,122 B2
(45) Date of Patent: May 21, 2013

(54) GAS SPRING WITH GUIDE

(75) Inventors: Jonathan P. Cotter, Dearborn, MI (US); Michael C. Diebolt, Northville, MI (US); Jeremy M. Kluck, Howell, MI (US)

(73) Assignee: DADCO, Inc., Plymouth, MI (US)

( * ) Notice: Subject to any disclaimer, the term of this patent is extended or adjusted under 35 U.S.C. 154(b) by 1118 days.

(21) Appl. No.: 11/854,886

(22) Filed: Sep. 13, 2007

(65) Prior Publication Data

US 2009/0072453 A1 Mar. 19, 2009

(51) Int. Cl.
*F16F 5/00* (2006.01)

(52) U.S. Cl.
USPC ............................ 267/119; 267/64.13

(58) Field of Classification Search
USPC ................ 267/64.11, 64.15, 118, 119, 120, 267/122, 124, 127, 64.26, 64.13; 188/297, 188/301, 289
See application file for complete search history.

(56) References Cited

U.S. PATENT DOCUMENTS

| | | | | |
|---|---|---|---|---|
| 2,815,254 A * | 12/1957 | Soman et al. | ................ | 267/119 |
| 2,994,301 A * | 8/1961 | Kirsch | ................ | 267/119 |
| 4,662,616 A * | 5/1987 | Hennells | ................ | 267/64.28 |
| 4,664,362 A * | 5/1987 | Hennells | ................ | 267/119 |
| 4,702,463 A * | 10/1987 | Krautkramer | ................ | 267/64.26 |
| 4,765,227 A * | 8/1988 | Balazs et al. | ................ | 91/417 R |
| 4,792,128 A * | 12/1988 | Holley | ................ | 267/118 |
| 5,065,607 A * | 11/1991 | Kadis et al. | ................ | 72/351 |
| 5,088,698 A * | 2/1992 | Wallis | ................ | 267/119 |
| 5,172,892 A * | 12/1992 | Wallis | ................ | 267/119 |
| 5,197,718 A * | 3/1993 | Wallis | ................ | 267/119 |
| 5,303,906 A | 4/1994 | Cotter et al. | | |
| 5,314,172 A * | 5/1994 | Wallis | ................ | 267/119 |
| 5,318,281 A * | 6/1994 | Wallis | ................ | 267/119 |
| 5,339,932 A * | 8/1994 | Lanterman | ................ | 188/316 |
| 5,465,811 A * | 11/1995 | Katz | ................ | 184/24 |
| 5,549,182 A * | 8/1996 | Ehrnsberger et al. | ................ | 188/129 |
| 5,653,425 A * | 8/1997 | Page et al. | ................ | 267/64.15 |
| 5,775,677 A * | 7/1998 | Englund | ................ | 267/64.11 |
| 5,823,513 A * | 10/1998 | Stenquist | ................ | 267/64.26 |
| 6,003,848 A | 12/1999 | Cotter et al. | | |
| 6,170,809 B1 | 1/2001 | Cotter | | |
| 6,322,059 B1 * | 11/2001 | Kelm et al. | ................ | 267/119 |
| 6,491,143 B1 * | 12/2002 | Stenquist | ................ | 188/269 |
| 6,796,159 B2 * | 9/2004 | Kelm et al. | ................ | 72/351 |
| 7,152,451 B1 | 12/2006 | Cotter | | |
| 7,331,570 B2 | 2/2008 | Stenquist | | |
| 7,559,542 B2 * | 7/2009 | Cotter | ................ | 267/64.11 |
| 2001/0002076 A1 * | 5/2001 | Cotter | ................ | 267/119 |
| 2004/0261469 A1 * | 12/2004 | Park et al. | ................ | 68/23 R |
| 2006/0032716 A1 * | 2/2006 | Sintorn | ................ | 188/284 |
| 2006/0033248 A1 * | 2/2006 | Stenquist | ................ | 267/64.11 |
| 2006/0231991 A1 * | 10/2006 | Chun et al. | ................ | 267/119 |

\* cited by examiner

*Primary Examiner* — Thomas Irvin

(74) *Attorney, Agent, or Firm* — Reising Ethington P.C.

(57) ABSTRACT

In at least one embodiment, a gas spring includes a casing having an inner surface defining in part a gas chamber, a piston rod and a seal. The piston rod is received at least partially in the casing for reciprocation along an axis between extended and retracted positions. The piston rod has an internal cavity defining a hollow space, a stop and a rod guide disposed adjacent to the inner surface of the casing to guide the reciprocation of the piston rod at least in part. The seal generally is provided between the piston rod and the casing to prevent gas leakage from the gas chamber.

19 Claims, 3 Drawing Sheets

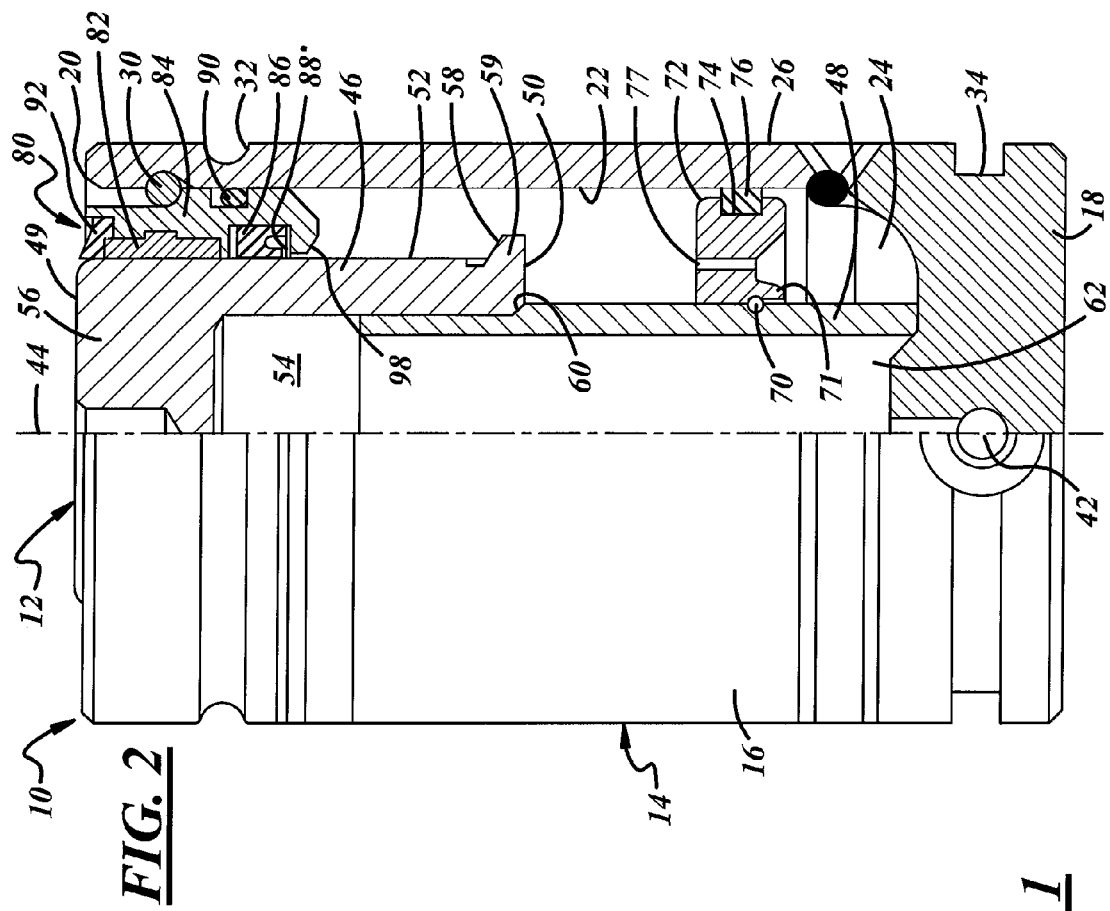
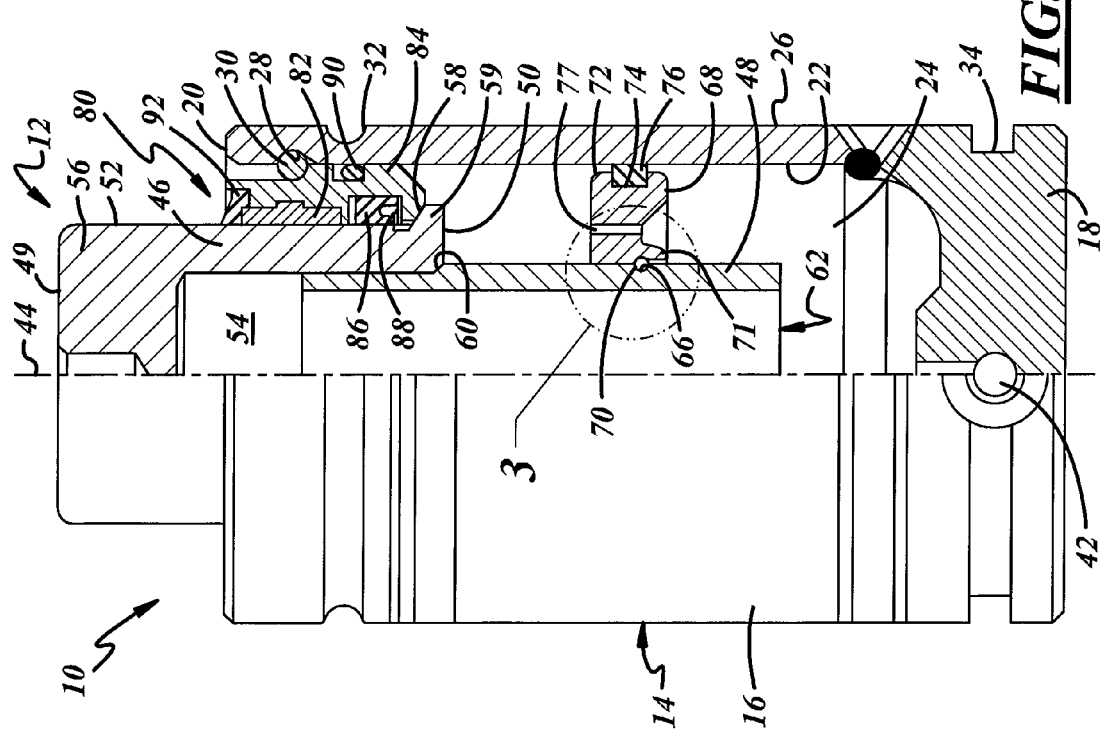

GAS SPRING WITH GUIDE

FIELD OF THE INVENTION

This invention relates generally to gas springs, and more particularly to a gas spring including a guide.

BACKGROUND OF THE INVENTION

Gas springs are well known and have been used in dies of presses for sheet metal stamping operations. Conventional gas springs have a gas chamber which receives a pressurized gas that provides a force on a piston and a solid piston rod which carries the piston to bias them to an extended position. The pressurized gas resists the movement of the piston and the piston rod from their extended position to a retracted position. Various housings and seals are provided in the gas spring to retain the piston and piston rod within a casing of the gas spring and to prevent leakage of the pressurized gas from the gas chamber.

The solid piston rod takes up significant volume in the gas spring and a conventional design has a relatively small diameter piston rod compared to the internal diameter of a casing in which the piston rod reciprocates. Because the ratio of piston rod diameter to casing diameter is small, the pressure increase during piston rod travel is less than 100% although the force curve is not very flat, as generally shown by line A in FIG. 10.

To gain more effective force, piston rods have been made larger in diameter. To avoid an undesired pressure increase during a stroke due to use of the larger diameter piston rod, the piston rod can be made to some degree hollow. However, as the depth of the blind bore increases, the cost to manufacture the piston rod increases dramatically. To achieve a longer stroke, a longer bearing surface is needed. But a longer bearing surface requires a longer piston rod, which in turn requires a deeper and much more costly bore. Further, the longer bearing assembly consumes gas chamber volume and thereby leads to a greater pressure increase during the stroke. The force increase during a piston rod stroke is higher in this type design, as shown by line B in FIG. 10.

SUMMARY OF THE INVENTION

In at least one embodiment, a gas spring includes a casing having an inner surface defining in part a gas chamber, a piston rod and a seal. The piston rod is received at least partially in the casing for reciprocation along an axis between extended and retracted positions. The piston rod has an internal cavity defining a hollow space, a stop and a rod guide disposed adjacent to the inner surface of the casing to guide the reciprocation of the piston rod at least in part. The seal generally is provided between the piston rod and the casing to prevent gas leakage from the gas chamber.

In one implementation, a gas spring includes a casing having an inner surface defining in part a gas chamber, and a piston rod received at least partially in the casing for reciprocation along an axis between extended and retracted positions. The piston rod may have a first portion extending out of the casing at least in the extended position of the piston rod and a second portion formed separately from the first portion and connected to the first portion for conjoint movement therewith along the axis. A rod guide carried by the second portion of the piston rod has at least a portion disposed adjacent to the inner surface of the casing and a seal is provided between the piston rod and the casing. In at least some applications, the two piece piston rod construction can facilitate providing a larger diameter and substantially hollow piston rod that can have a greater length at far less cost, and can have improved guided movement.

In one implementation, the second portion of the piston rod is a hollow tube connected to the first portion. The first portion may include a blind bore or cavity, although because the cavity is formed only in the first portion, it is not as deep compared to when the piston rod is formed in one piece and can be formed without great expense. Even though the cavity in the first portion is not deep, the addition of the tubular second portion provides an increased effective hollow length of the piston rod to reduce the volume of the gas chamber that is taken up by the piston rod. Further, in at least some applications, a stop that limits travel of the piston rod toward its extended position can be formed on the first portion of the piston rod and therefore, the second portion of the piston rod can be formed of a thinner and/or weaker material.

BRIEF DESCRIPTION OF THE DRAWINGS

The following detailed description of preferred embodiments and best mode will be set forth with regard to the accompanying drawings in which:

FIG. 1 is a partial sectional view of one presently preferred embodiment of a gas spring with a piston rod shown in its extended position;

FIG. 2 is a view similar to FIG. 1 with the piston rod in its retracted position;

DETAILED DESCRIPTION OF PREFERRED EMBODIMENTS

Figure 3:
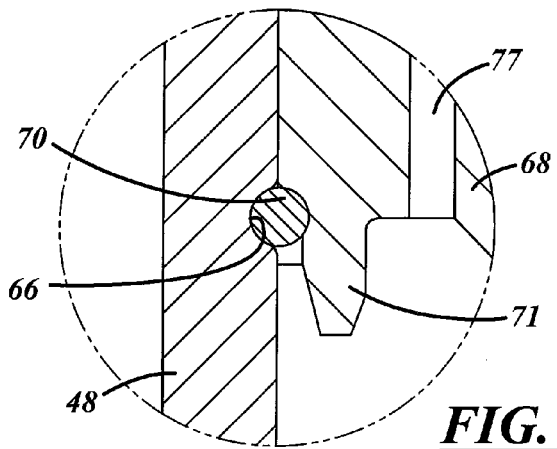
FIG. 3 is an enlarged fragmentary view of a portion of the piston rod of FIG. 1 shown prior to final assembly.

Referring in more detail to the drawings, FIGS. 1 and 2 illustrate one presently preferred embodiment of a gas spring 10, such as those used in mechanical presses (not shown). Generally, a plurality of gas springs 10 may be disposed in the mechanical press such that a piston rod 12 of each gas spring 10 is engaged and driven by a ram of the press as the ram advances to form a sheet metal blank in a die assembly of the press.

The gas spring has a casing 14 with a generally cylindrical wall 16 terminating at a generally closed end 18, and at another end 20 that is substantially open for receiving the piston rod 12 therein. Generally, the closed end 18 is attached, for example through a weld joint, or formed as one piece with the cylindrical wall 16. The wall 16 of the casing 14 has an inner surface 22 defining at least in part a gas chamber 24, and an outer surface 26. The inner surface 22 of the wall 16 has a circumferential retainer groove 28 constructed for receipt of a retainer, shown here by way of example as a snap ring 30, to maintain the gas spring 10 in its assembled state. To facilitate mounting and locating the gas spring 10 within the press, a pair of longitudinally spaced circumferential grooves 32, 34 are formed in the outer surface 26 of the casing 14 adjacent its ends 18, 20.

To admit gas into the gas spring 10, the casing 14 has a passage or fill port 42 extending between the inner and outer surfaces 22, 26 of the wall 16, shown here as extending through the closed end 18 of the casing 14. A fill valve (not shown) received in the fill port 42 acts as a one way valve and allows gas to be admitted into the gas spring 10, while preventing the gas from unintentionally exiting the gas spring 10. The fill valve preferably may be opened to release pressurized gas from within the gas spring 10, when desired.

The piston rod 12 is acted on by gas in the gas chamber 24 and is received in the casing for reciprocation along an axis 44 between an extended position (FIG. 1) and a retracted position (FIG. 2). The piston rod 12 may include a first portion 46 and a second portion 48 that may be formed separately from each other, from separate pieces of material.

The first portion 46 has one end 49 preferably extending out of the casing 14 at least when the piston rod 12 is in its extended position and adapted for operable engagement with the ram of the press, and another end 50 received within the casing 14. The first portion 46 may have a generally cylindrical outer surface 52, and a cavity such as a blind bore 54 so that the end 50 is generally open. The depth of the blind bore 54 may be greater than the thickness of an end wall 56 defined between the blind bore 54 and the end 49. The first portion 46 may carry a stop 58, which in at least one implementation may include an outwardly extending annular flange 59. In other implementations, the stop may include circumferentially spaced and radially extending tabs or other stop surface or surfaces. The stop 58 may be integrally formed in one-piece with the first portion 46, or connected thereto or otherwise carried thereby.

The second portion 48 of the piston rod 12 may be hollow so that it does not take up significant volume in the gas chamber 24. In one implementation, the second portion 48 is a generally thin-walled tube connected to the end 50 of the first portion 46. The second portion 48 may be connected to the first portion 46 in any suitable manner such as by press-fit, adhesive, mating threads, weld, snap fit, retaining ring, etc. The second portion 48 may include a shoulder 60 or other surface that may limit insertion of the second portion 48 into the bore 54 of the first portion 46, and/or provide an increased surface area of engagement between the first and second portions 46, 48 to improve the rigidity and stability of their connection. A passage or opening 62 through the second portion 48 may be coaxially aligned with the blind bore 54 in the first portion 46, and the second portion may be coaxially aligned with the first portion for conjoint movement therewith along the axis 46. A groove 66 may be formed in the second portion 48 to facilitate connecting a rod guide 68 thereto as set forth in more detail below.

Figure 4:
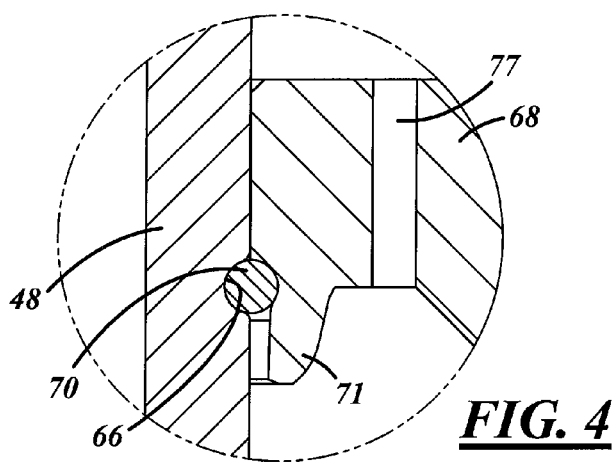
FIG. 4 is an enlarged fragmentary view of the portion of the piston rod shown FIG. 3 after final assembly.

The rod guide 68 may be carried by one or both of the first portion 46 and the second portion 48, and is shown in this embodiment as being carried by the second portion 48. The rod guide 68 may be annular and disposed around a portion of the outer surface of the second portion 48 adjacent to the groove 66. A retaining ring 70 may be disposed in the groove 66 and adjacent to the rod guide 68 to maintain the position of the rod guide on the second portion of the piston rod. As best shown in FIG. 3, the rod guide 68 may include an annular recess that is received over the retaining ring 70. Then, as shown in FIG. 4, a depending skirt or annular flange 71 of the rod guide 68 may be crimped or partially rolled over the retaining ring 70 to firmly connect the rod guide 68 to the second portion 48 of the piston rod 12.

Figure 5:
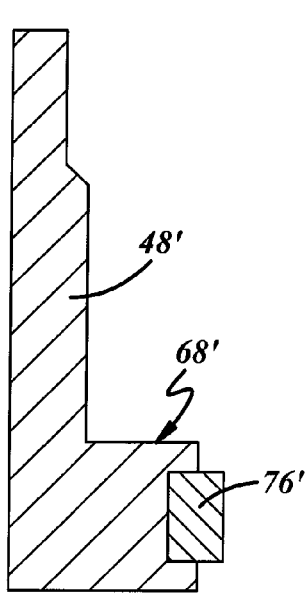
FIG. 5 is an fragmentary sectional view of one embodiment of a second portion of a piston rod.

The rod guide 68 may be generally annular with a peripheral surface 72 in which a groove 74 may be formed to receive an annular guide bearing 76 or wear strip. The guide bearing 76 may be constructed from any suitable low friction material and is sized to slidably engage the inner surface 22 of the casing 14 to guide the piston rod 12 for axial reciprocation within the casing 14. One or more passages 77 may be formed through the rod guide 68 to prevent the rod guide from acting as a piston and/or unduly restricting gas flow in the gas chamber during a stroke of the piston rod 12. This minimizes the temperature increase that could otherwise occur in use because of a restriction to gas flow across the rod guide 68. As shown in FIG. 5, in another implementation, a rod guide 68' can be integrally formed in one-piece with a second portion 48' of a piston rod, and may carry a bearing 76' generally as previously described with regard to rod guide 68 and bearing 76.

In one implementation, the rod guide 68 is retained on the second portion 48 of the piston rod 12 by a connection feature that is adapted to fail before the connection between the first portion 46 and second portion 48 fails. In this manner, the rod guide 68 may be adapted to be released from its rigid connection to the piston rod 12 before the second portion 48 of the piston rod is separated from the first portion 46, due, for example, to unusual side loading on the second portion 48 or binding of the rod guide 68. The connection feature can include any suitable manner or mechanism to connect the rod guide 68 to the piston rod 12, such as the retaining ring 70, adhesive, weld, threads, press-fit or the rod guide 68 could be a split ring received in a groove on the piston rod 12, by way of examples without limitation. In the embodiment shown in FIGS. 1-4, the rod guide 68 can only be released from the piston rod 12 if the crimped or rolled flange 71 is deflected sufficiently to pass the retaining ring 70 such that the rod guide could then move along the second portion and toward the stop 58. Engagement of the rod guide 68 with the retaining ring 70 prevents the rod guide from moving along the second portion in the opposite direction (i.e. in the direction tending to remove the rod guide 68 from the piston rod 12). This may prevent damage to the other components of the gas spring by maintaining the rod guide trapped on the piston rod 12.

As shown in FIGS. 1 and 2, the gas spring 10 has a bearing and seal assembly 80 that seals the open end of the casing 14 to prevent escape of gas from the gas chamber 24 and provide a bearing 82 that helps guide the piston rod 12 movement. Accordingly, the piston rod 12 is guided at two spaced apart locations by both the bearing 76 (carried by the rod guide 68) and the bearing 82. The bearing and seal assembly 80 includes a body 84 that carries the bearing 82, a rod seal 86 (which may include a backup plate 88 or ring to prevent extrusion of the seal 86 between the rod 12 and body 84), a casing seal 90 such as an o-ring and a wiper 92 to keep contaminants out of the bearing and seal assembly 80. The body 84 may engage the retaining ring 30 received in the casing 14 to retain the body 84 and its components relative to the casing 14. An end of the body 84 may define a stop surface 98 (FIG. 2) adapted to be engaged by the stop 58 of the piston rod 12 to limit movement of the piston rod 12 away from the closed end 18 of the casing 14. In at least some embodiments, the engagement of the stop surfaces 58, 98 may define the fully extended position of the piston rod 12.

With the piston rod 12 received in the casing 14, and the bearing and seal assembly 80 maintained within the casing 14 by the retaining ring 30, the gas spring 10 may be charged with gas through the fill port 42. The pressurized gas yieldably biases the piston rod 12 to its extended position wherein the piston rod stop 58 engages the stop 98 defined by the body. Typically, a plurality of charged gas springs 10 are received in a die assembly with a work piece clamp ring or binder ring resting on the ends 48 of the extended piston rods 12.

Figure 6:
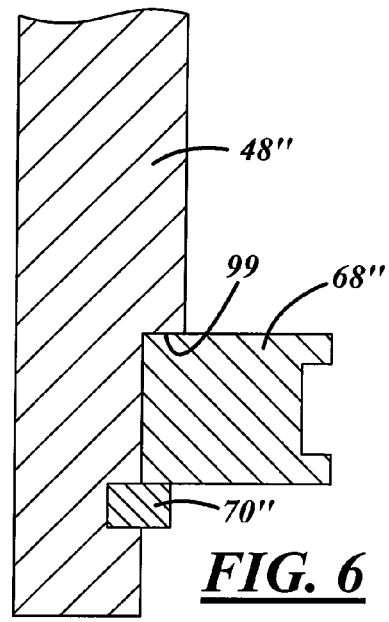
FIG. 6 is a is an fragmentary sectional view of another embodiment of a piston rod.

As shown in FIG. 6, a rod guide 68" may be trapped between a shoulder 99 of a second portion 48" of a piston rod and a retaining ring 70" to maintain the rod guide 68" on the second portion 48". The failure mode of this connection may be a release of the rod guide 68" from the piston rod upon breaking of at least a portion of the retaining ring 70".

Figure 7:
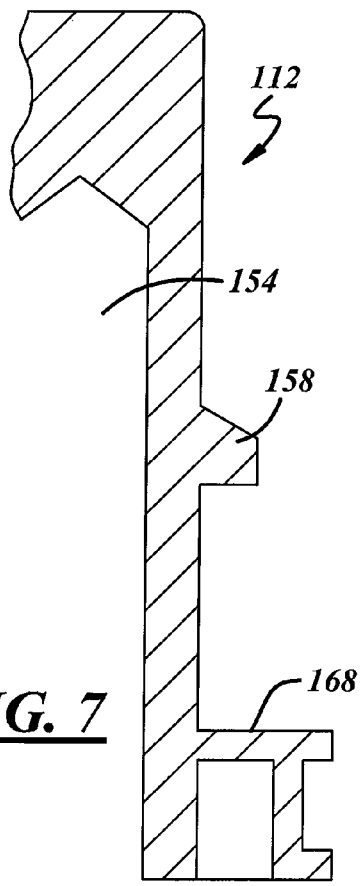
FIG. 7 is a is an fragmentary sectional view of another embodiment of a piston rod.

As shown in FIG. 7, in one embodiment an entire piston rod 112 and rod guide 168 can be formed in one piece and include an outwardly extending stop 158 and an outwardly extending rod guide 168. A cavity 154 may extend substantially the entire length of the piston rod 112, as desired.

Figure 8:
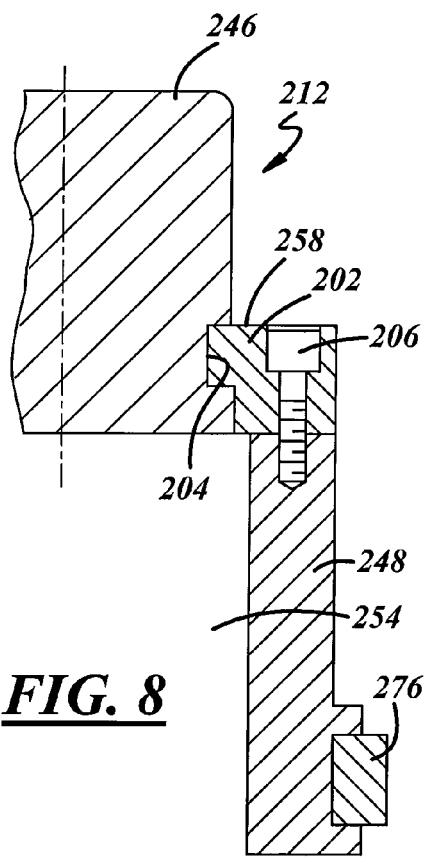
FIG. 8 is a is an fragmentary sectional view of another embodiment of a piston rod.

In the embodiment shown in FIG. 8, a multiple piece piston rod 212 is shown. A first portion 246 is generally cylindrical and solid, that is, without any significant blind bore or cavity formed therein. A split ring retainer 202 is received in a groove 204 formed in an outer surface of the first portion 246 and extends radially outwardly of the first portion. In this manner, the retainer 202 defines the stop 258 adapted to engage a stop surface carried by the casing 14 (such as a stop 98 on the bearing and seal assembly 80). A second portion 248 of the piston rod 212 is connected to the retainer 202 (which defines the stop), such as by threaded fasteners 206 or otherwise as desired. The second portion 248 may be generally axially aligned with the stop 258 and may include a rod guide portion 268 which may be adapted to receive a bearing 276 to help guide movement of the piston rod 212. The second portion may also be at least partially hollow or tubular to define a cavity 254 of the piston rod 212.

Figure 9:
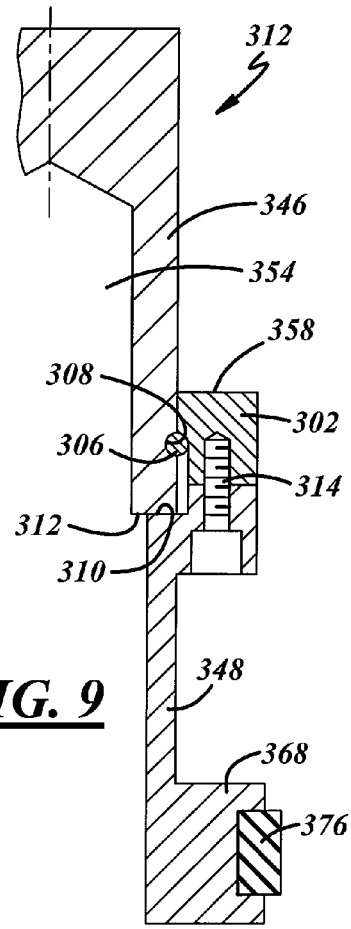
FIG. 9 is a is an fragmentary sectional view of another embodiment of a piston rod.

A different embodiment of a piston rod 312 is shown in FIG. 9. In this embodiment, the first portion 346 of the piston rod 312 may be formed similarly to the first portion 46 of the piston rod 12 shown in FIGS. 1 and 2 except this first portion 346 does not include an integral flange like flange 59 on piston rod 12. The first portion 346 therefore includes a cavity 354 such as blind bore. Instead, an annular retainer 302 is provided radially outwardly of an outer surface 304 of the first portion 346 to define a stop 358. The retainer 302 is held in place against movement in one direction by a snap-ring 306 carried in a groove 308 in the first portion 346 and against movement in the other direction by its connection to a second portion 348 of the piston rod 312. The second portion 348 may be tubular and may include a shoulder 310 that bears on an end 312 of the first portion 346. The second portion 348 may be connected to the retainer 302 in any suitable manner, such as by threaded fasteners 314. In this manner, the first portion 346, second portion 348 and stop/retainer 302 are firmly held together, but they may be readily taken apart for service or repair, by removing the fasteners 314. A rod guide 368 may be provided integrally with or as a separate component from the second portion 348 and may include a bearing 376.

Figure 10:
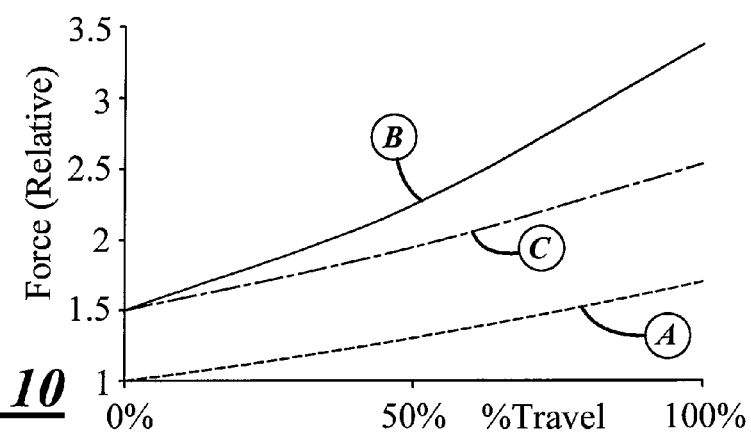
FIG. 10 is a graph of force as a function of piston rod travel for three types of piston rod and gas spring configurations.

In at least some embodiments of the gas spring, the piston rod can be formed with a greater length without significantly increasing the volume of the gas chamber used up by the piston rod. As shown in line C of FIG. 10, this permits the gas spring to have an increased effective force similar to that of prior gas springs of similar size and operating parameters that have piston rods with some hollow portion (e.g. of the type shown by line B) and higher than gas springs having a solid piston rod design (e.g. of the type shown by line A), while maintaining a relatively flat force v. travel curve compared to that shown by line B. Accordingly, the gas spring can provide an increased effective force with a maximized gas chamber volume for a given size and a relatively constant force over its stroke length.

In at least some embodiments, the hollow portion of the piston rod, defined by a cavity in the first portion (if any) and a tubular or at least partially hollow second portion, extends over half of the length of the piston rod, and may extend up to 95% of the piston rod length. Further, in at least some embodiments, the thickness of the end wall 56 of the piston rod 12 may be between about 40% and 100% of the diameter of the cavity or blind bore 54 in the first portion 46.

Further, the piston rod 12 may have an increased effective guide length, which may be defined as the distance between the end of the bearing 82 closest to the end 49 of the piston rod 12, and the opposite end of the bearing 76 carried by the rod guide. The minimum guide length occurs when the piston is in its extended position since in this position the rod guide is closest to the bearing 82. In at least some implementations, the minimum effective guide length may be between about 100% to 200% of the diameter of the piston rod, and in some cases may be limited only by the length of the casing and piston rod. In other words, the effective guide length could be as long as the casing, or even somewhat longer if, for example, the bearing and seal assembly 80 extended out of the open end of the casing 14. Further, the spaced guide bearings permits use of a smaller bearing and a smaller bearing and seal assembly to reduce the volume of the gas chamber consumed by these components while providing a long overall guide length.

It should be recognized that one ordinarily skilled in the art will recognize other embodiments encompassed within the scope of this invention. For example, when the piston rod is formed in more than one piece, the second portion of the piston rod may be attached to the first portion in any given manner or arrangement and the plurality of arrangements shown and described are merely exemplary and not a complete or exhaustive list or representation. Likewise, the rod guide can be carried by or formed integrally with the piston rod, or any portion of the piston rod, in any number of ways. Further, the bearing of the rod guide may be integral and in one-piece with the second portion rather than a separate part carried by the second portion. Of course, still other embodiments and implementations can be achieved in view of this disclosure. The embodiments described above are intended to be illustrative and not limiting. The scope of the invention is defined by the claims that follow.

The invention claimed is:

1. A gas spring, comprising:
   a casing having an open end and an inner surface defining in part a gas chamber;
   a piston rod received at least partially in the casing for reciprocation along an axis between extended and retracted positions, the piston rod having a first portion with a closed end and extending out of the casing at least in the extended position and a separate second portion formed separately from the first portion and connected to the first portion for movement in unison therewith along the axis, and at least the second portion defining a hollow space continuously communicating with the gas chamber;
   a rod guide carried by the second portion of the piston rod, received in the gas chamber and slidably engaging the inner surface of the casing to guide the reciprocation of the piston rod at least in part;
   a first stop carried by and within the casing adjacent the open end of the casing;

a second stop carried by the piston rod between and spaced from both the closed end of the piston rod and the rod guide, separate from the rod guide and engaging the first stop when the piston rod is in its extended position;

a bearing received between the first portion of the piston rod and the casing and carried by the casing adjacent the open end of the casing to guide reciprocation of the piston rod at least in part;

the first stop is spaced from and does not engage the bearing and the second stop is spaced from and does not engage the rod guide carried by the second portion of the piston rod;

a seal between the piston rod and the casing to prevent gas leakage from the gas chamber; and at least one passage through the rod guide and continuously communicating with the gas chamber to prevent the rod guide from restricting gas flow in the gas chamber during movement of the piston rod between the extended and retracted positions of the piston rod.

2. The gas spring of claim 1 wherein the internal cavity extends over at least half of the length of the piston rod.

3. The gas spring of claim 1 wherein the second portion is a hollow tube.

4. The gas spring of claim 3 wherein the rod guide is carried by the second portion.

5. A gas spring, comprising:
a casing having an inner surface defining in part a gas chamber;
a piston rod received at least partially in the casing for reciprocation along an axis between extended and retracted positions, the piston rod having a first portion and a second portion formed separately from the first portion and connected to the first portion, a stop, an internal cavity defining a hollow space, and wherein the second portion is a hollow tube;
a rod guide carried by the second portion and disposed adjacent to the inner surface of the casing to guide the reciprocation of the piston rod at least in part;
a seal between the piston rod and the casing to prevent gas leakage from the gas chamber; and
wherein the rod guide is retained on the second portion by a connection feature and the connection feature is adapted to fail to release the rod guide from the second portion before the connection between the first portion and second portion fails.

6. The gas spring of claim 5 wherein the stop is carried by the first portion.

7. The gas spring of claim 6 wherein the stop is integrally formed in one-piece with the first portion.

8. The gas spring of claim 7 wherein the stop is defined by a radially outwardly extending flange of the first portion.

9. The gas spring of claim 5 wherein the connection feature includes a retaining ring.

10. The gas spring of claim 5 wherein the first portion of the piston rod includes a cavity defining part of an open end of the first portion.

11. The gas spring of claim 10 wherein the second portion is coaxially aligned with the cavity in the first portion.

12. The gas spring of claim 5 wherein the rod guide is connected to the second portion of the piston rod and remains spaced from the bearing and the seal in all positions of the piston rod.

13. The gas spring of claim 12 which also comprises a body that carries the seal and wherein the first portion includes a flange that defines a first stop and the body includes a second stop adapted to be engaged by the first stop to limit movement of the piston rod.

14. The gas spring of claim 12 wherein the rod guide is connected to the second portion with a ring retainer.

15. The gas spring of claim 5 wherein the casing includes a closed end and the piston rod has a length such that when the second portion engages the closed end of the casing the first portion of the piston rod is maintained in engagement with the seal to maintain a seal between the casing and the piston rod.

16. The gas spring of claim 5 wherein the internal cavity extends over at least half the axial length of the piston rod.

17. The gas spring of claim 5 wherein the second portion is connected to the stop to interconnect the first portion and the second portion of the piston rod.

18. The gas spring of claim 5 wherein the second portion includes a shoulder and the rod guide is received between the shoulder and a ring retainer connected to the second portion to maintain the position of the rod guide on the second portion.

19. A gas spring, comprising:
a casing having an open end and an inner surface defining in part a gas chamber;
a piston rod received at least partially in the casing for reciprocation along an axis between extended and retracted positions, the piston rod having a first portion with a closed end and extending out of the casing at least in the extended position and a separate second portion formed separately from the first portion and connected to the first portion for movement in unison therewith along the axis, and at least the second portion defining a hollow space throughout its axial extent which continuously communicates with the gas chamber;
the second portion of the piston rod being connected to the first portion of the piston rod by at least one of a press fit, adhesive, mating threads, weld, snap fit or a retaining ring;
a rod guide carried by the second portion of the piston rod, received in the gas chamber and slidably engaging the inner surface of the casing to guide the reciprocation of the piston rod at least in part;
a first stop carried by and within the casing adjacent the open end of the casing;
a second stop carried by the piston rod between and spaced from both the closed end of the piston rod and the rod guide, separate from and spaced from the rod guide, fixed to the first portion of the piston rod, and engaging the first stop when the piston rod is in its extended position;
a bearing received between the first portion of the piston rod and the casing and carried by the casing adjacent the open end of the casing to guide reciprocation of the piston rod at least in part;
the first stop is spaced from and does not engage the bearing and the second stop is spaced from and does not engage the rod guide carried by the second portion of the piston rod;
a seal between the piston rod and the casing to prevent gas leakage from the gas chamber; and
at least one passage through the rod guide and continuously communicating with the gas chamber to prevent the rod guide from restricting gas flow in the gas chamber during movement of the piston rod between the extended and retracted positions of the piston rod.

\* \* \* \* \*